Aug. 2, 1966   A. J. CHARBONNEAU   3,264,420
CABLE GROUNDING, THREE POSITION, SNAP ACTION SWITCH
Filed July 1, 1964   2 Sheets-Sheet 1

Inventor,
Albert J. Charbonneau,
by Francis K. Doyle
His Attorney.

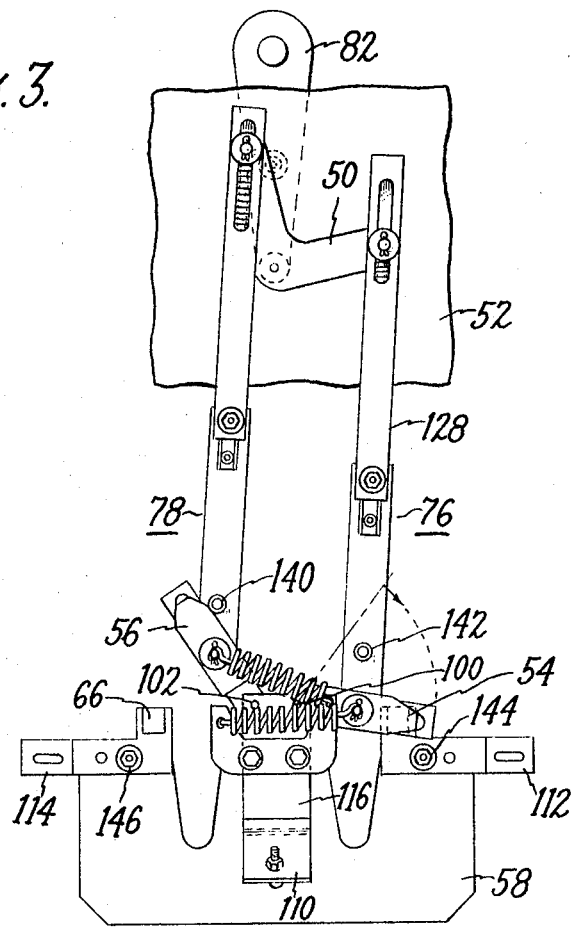
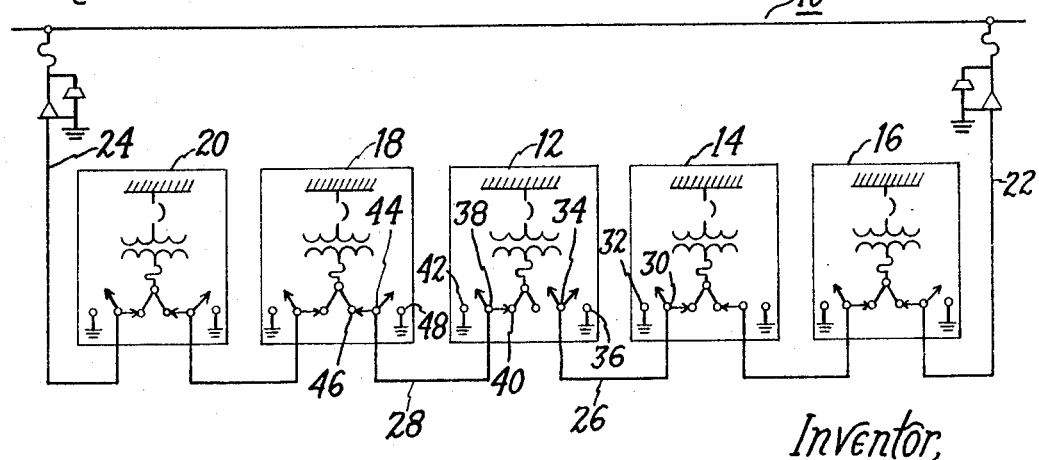

United States Patent Office 3,264,420
Patented August 2, 1966

3,264,420
CABLE GROUNDING, THREE POSITION,
SNAP ACTION SWITCH
Albert J. Charbonneau, Pittsfield, Mass., assignor to General Electric Company, a corporation of New York
Filed July 1, 1964, Ser. No. 379,550
3 Claims. (Cl. 200—48)

This invention relates to three position switches and more particularly to switches that are provided with a three position, snap action, having a cable grounding position which find special utility in distribution loop feed systems.

In recent years, distribution systems for distributing electrical power to consumers have changed in many respects. Among these changes has been the increased usage of a type of distribution system which has been termed "the open loop feed system." In this system, a plurality of distribution transformers are connected in an open loop to a source of electrical power. In such open loop feed systems each distribution transformer is provided with connecting means for two energized power lines. Either or both of these power lines may be connected to the various distribution transformers of the open loop feed system. When one distribution transformer or a cable section between distribution transformers develops a fault requiring its removal, the remaining distribution transformers in the loop system can still be energized by the alternate cables. As will be understood, the loop is always open at one point or section and the distribution transformers on each side of the open section are connected to an energized line from the source of electrical power.

One problem which has arisen in the use of open loop feed systems is the need of a means for removing a transformer from the line, when desired, or a means for sectionalizing a portion of the loop feed system. Sectionalizing, as used herein, means to isolate a portion of the loop feed system which connects two or more adjacent transformers in the system. For example, when it is necessary to remove a transformer from the line for inspection or repair, or a change-out, it is desired that the energized lines to the transformer be de-energized before work is begun on that transformer. Further, when it is desired to inspect the wire or cable or to replace the wire or cable which connect two distribution transformers of the system it is, of course, desirable that this portion of the line be de-energized; that is, that the particular section of power cable between two transformers be sectionalized by removing it from the source of power. To perform the above functions either the transformer must be disconnected from the two energized lines or the line which is connected to the two transformers must be disconnected from each of the transformers. As will be apparent to those skilled in the art, it is preferred that this disconnection be accomplished by switching means in each transformer.

It has recently been proposed to provide a single three position switch for each transformer of a loop feed system. This three position switch generally provides a switch which either connects the transformer to both energized lines or which may be operated to connect the transformer to either energized line. Such a three position switch is described and claimed in application serial No. 168,479, filed Jan. 24, 1962, for Three Position Snap Action Switch, in the name of Gerald P. Hermann, now Patent No. 3,150,243, issued Sept. 22, 1964, which application is assigned to the same assignee as this application. While the three position switch disclosed and claimed in the Hermann application finds great utility in loop feed systems, it is considered unacceptable by some electric utilities. These electric utilities, which consider the Hermann switch unacceptable, require that provisions be made for grounding the cable which is de-energized, such as is necessary in sectionalizing a portion of the power cable between two transformers.

In providing cable grounding means, it is generally considered undesirable to use a two position switch; that is, one which goes directly from the energized position to the grounded position. Such switching is considered undesirable because of the capacitive effect of the energized cable, and also due to the possibility of drawing an arc from the energized transformer connection to the grounded contact. From this it will be apparent that a three position switch is presently needed in the open loop feed system field to provide a cable grounding switch for distribution transformers of loop feed systems.

It is, therefore, one object of this invention to provide a novel, three position, cable grounding switch.

A further object of this invention is to provide a three position switch for loop feed systems which will enable the disconnecting of a cable from an energized transformer and grounding of such cable without danger of drawing an arc from the energized transformer to the grounded contact.

It will be understood by those skilled in this art that the lines used to energize the various transformers of a loop feed system will carry a large quantity of electrical power, generally, the sum of the load of the various transformers connected to the loop. Opening the contacts of a switch carrying a large amount of electrical power will, of course, draw a substantial arc between the opening contacts. Clearly it is desirable that a switch to open contacts on a large quantity of electrical power be provided with a snap action during the opening of the contacts in order to break any arc which is formed during the contact opening. Further, a snap action is desired on the closing of the contacts of the switch to prevent pitting of such contacts and to prevent the welding of he contacts should they be closed on a fault.

It is, therefore, a further object of this invention to provide a novel, three position, cable grounding switch having snap action on both opening and closing of all contacts.

Briefly, a preferred form of the three position, cable grounding switch of this invention comprises an actuating member which is pivotally secured to a mounting member. A pair of movable contacts are pivotally mounted on the mounting member and connecting means are provided connecting the movable contacts to the actuating member. Another pair of contact means are fixedly positioned on the mounting member, one of which is adapted to be connected to a transformer, while the other is for connection to a ground. The relation between the actuating member and the movable contacts is such that in one position of the actuating member the movable contacts are in open position. In another position of the actuating member one movable contact is connected to the fixed transformer contact while the other movable contact is open. In a third position of the actuating member the other movable contact is connected to the fixed ground contact while the one movable contact is opened. Spring means are provided connected between each movable contact and the mounting member to provide snap action in both opening and closing with the fixed contacts.

The invention which is sought to be protected will be clearly pointed out and distinctly claimed in the claims which are appended hereto. However, it is believed that the full scope of this invention, as well as the manner in which its various objects and advantages are obtained, as well as other objects and advantages thereof, will be more fully understood from the following detailed description of a preferred embodiment thereof especially when considered in the light of the accompanying drawings, in which:

FIGURE 3 is a plan view similar to FIG. 1 showing the switch in another position; and FIGURE 4 is a schematic representation of an open loop feed distribution system using switches made according to this invention.

Figure 1:
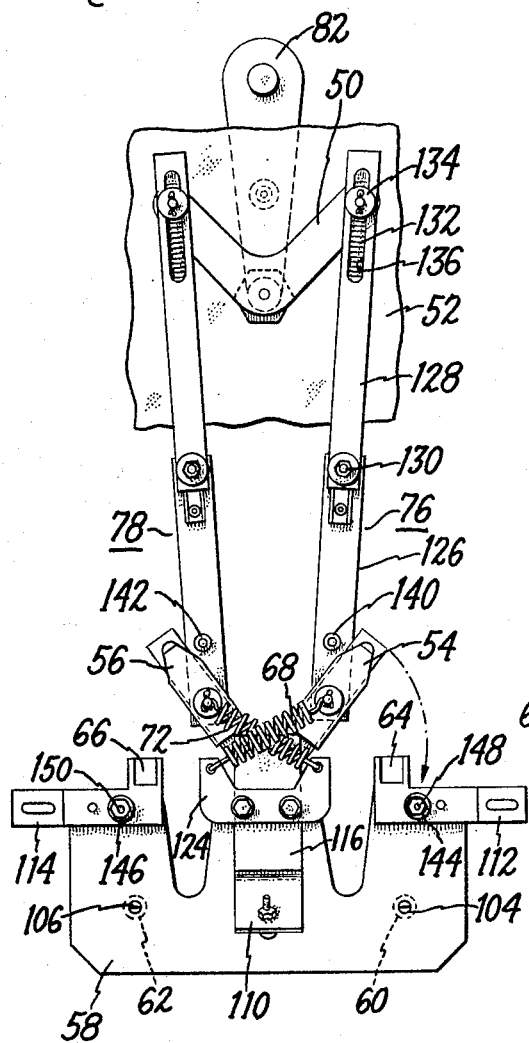
FIGURE 1 is a plan view of a preferred form of the three position, cable grounding switch according to this invention.

Reference will now be made to the drawings, in which like numerals will be used to indicate like parts throughout the various views thereof. The drawings show a novel three position, snap acting, cable grounding switch according to a preferred embodiment of this invention. This novel, three position, snap action, cable grounding switch finds special utility in an open loop feed distribution system such as is shown schematically in FIG. 4.

Referring first to FIG. 4, the open loop feed system is shown as comprising a plurality of distribution transformers connected in an open loop to a source of electrical power, such source being designated as 10. As shown, the loop feed system 10 is open between the transformer 12 and transformer 14. The distribution transformers are shown as being serially connected to the power source 10, three on one side of the open connection and two on the opposite side. Thus all the distribution transformers are energized through the source 10. Should one of the distribution transformers develop a fault, such that it must be removed from service, for example distribution transformer 12, then it can be seen that the distribution transformers 14 and 16 will still be energized from source 10 by means of line 22, while the distribution transformers 18 and 20 will still be energized by line 24 from the source 10. To remove distribution transformer 12 from the energized line, it is necessary to devise some disconnecting means to disconnect line 26 between distribution transformers 12 and 14 (presently shown as being opened between these transformers) and also to disconnect line 28 between transformers 12 and 18. To obtain this desired disconnection it is necessary that switch means be provided in each distribution transformer. As earlier mentioned, many utilities require that the switch means provided be such that the disconnected cable may be connected to a grounded contact within the disconnected transformer. In the above example a switch in transformer 14, shown schematically as switch 30, may be used to disconnect transformer 14 from the line 26 and connect line 26 to grounded contact 32, as indicated. A switch 34 in transformer 12 may be used to disconnect transformer 12 from the line 26, also connecting line 26 to the grounded contact 36, as shown. Further, the switch 38 in transformer 12 may be used to disconnect transformer 12 from line 28, the switch presently being shown as connecting line 28 to the transformer contact 40, which would, of course, energize transformer 12. However, as can be seen, switch 38 may also be moved to provide connection to the ground contact 42 in transformer 12, thus disconnecting transformer 12 from line 28 and grounding line 28 at contact 42. In the same manner, a switch 44 in transformer 18 may be used to disconnect line 28 from transformer 18; presently shown as being connected to transformer contact 46. Of course, switch 44 may be actuated to place switch 44 on grounded contact 48, thus effectively grounding the other side of line 28.

Of course, as will be understood, with a fault developed in transformer 12, which is presently shown as being connected through line 28 to the transformer 18, thereby being energized by means of line 24 from source 10 through transformers 20 and 18 with the present position of the various switches, it is desirable that switch 44 be opened to remove energy from the line 28 which is connected by means of switch 38 to transformer 12. In opening switch 44 it is desired that the switch first be moved to an open position, to prevent drawing any arc from the contact 46 to the grounded contact 48, prior to grounding of the cable 28 at contact 48. Of course, it will also be understood that with the switch 38 connected to transformer contact 40 in transformer 12, even though a fault has developed in transformer 12, due to capacitance effect within the transformer, as well as within the line 28, it is desirable to first open switch 38 prior to grounding the switch 44 at contact 48. Thus, as will be understood, with a fault developed at transformer 12, switch 44 will first be opened, then switch 38 will be opened from contact 40 and after opening will then be moved to grounded contact 42, then switch 44, if desired, may also be moved to grounded contact 48. However, with the end of line 28 in transformer 12 grounded on contact 42, it would not be necessary to ground the opposite end of line 28. Thus, it will be seen that by means of switch 38 and switch 44 it is possible to remove the energized connection to transformer 12 in a safe manner without any possibility of drawing arcs from the energized contacts and without the possibility of grounding the transformer or line prior to discharge of its capacitance effect. With the disconnection made by means of switches 30, 34 and switches 38 and 44, transformer 12 is completely disconnected from the loop feed system, while the remaining transformers are still energized. Transformers 14 and 16 are energized by means of line 22 and transformers 18 and 20 are energized by means of line 24. Thus the transformer 12 is effectively removed from the electrical power and may be repaired or changed out as necessary without disturbing the energization of the other transformers in the system.

Of course, from the above it will be apparent that if it were desirable to disconnect line 28 such that the line 28 might be inspected or replaced as necessary, then line 28 may be removed from transformer 12 and 18 in the manner previously indicated while transformer 12 may be connected to transformer 14 by means of switches 30 and 34 such that transformer 12 would then be energized from line 22 through transformers 16 and 14 and line 26. Transformers 18 and 20 would be still energized through line 24 and the cable section 28 would be completely disconnected from the distribution loop feed system without in any manner disturbing the energization of the various transformers in the loop feed system. The novel three position, snap action, cable grounding switch of this invention is uniquely designed for use in the above type system. However, as will be apparent from the following description, the three position, snap acting, cable grounding switch of this invention is not necessarily limited to use in loop feed systems.

Figure 2:
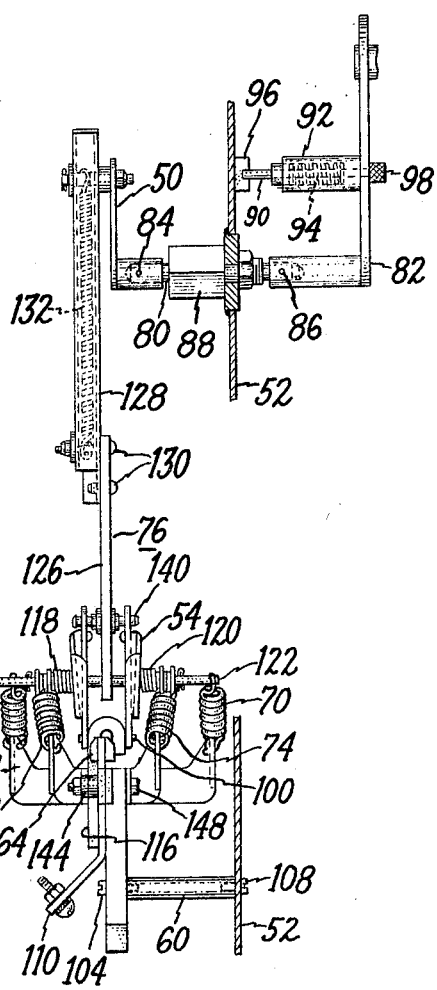
FIGURE 2 is a side view of the switch shown in FIG. 1.

Referring now to FIGS. 1 and 2 of the drawing, a preferred embodiment of the novel, three position snap action cable grounding switch of this invention will be described in detail. As shown, the three position, snap acting, cable grounding switch comprises an actuating member such as the crank 50 which is pivotally secured to a mounting member 52, as shown in FIGS. 1 and 2. The mounting member 52 may be a transformer wall or other enclosing means or it may be a mounting member which is secured within a transformer. In the preferred embodiment shown, two pairs of movable contacts 54 and 56 are provided being pivotally mounted to an insulating member 58, which may be connected to the tank wall 52 in any desired manner, such as for example by the insulating bushings 60, 62. Movable contacts 54 and 56 are movable into and out of engagement with the fixed contacts 64, 66, respectively. Spring means 68, 70 are provided connected between contact 54 and insulating member 58, while spring means 72, 74 are provided connected between contact 56 and mounting member 58 to aid in moving the contacts into and out of engagement with the fixed contacts 64 and 66, in the manner to be hereinafter more fully described. Connecting means 76 and 78 are provided, connected between movable contacts 54 and 56, respectively, and the actuating member 50 for moving the movable contacts into and out of engagement with the fixed contacts 64 and 66.

As shown in the preferred embodiment of FIGS. 1 and 2, the cable grounding switch of this invention is in its open position whereby the movable contacts 54 and 56 are out of engagement with both fixed contacts 64 and 66. In this position, actuating member 50 is in the open position with connecting means 76 and 78 in a substantially vertical position. The actuating member 50 is pivotally connected to the mounting member, such as tank wall 52, by means of a shaft 80 which extends through the tank wall to an actuating handle 82. As will be understood, the three position, snap acting, cable grounding switch may be installed within a distribution transformer while the actuating handle 82 is on the exterior of such transformer to allow its ready manipulation either by a switch stick of by hand, as desired. An indicator may also be provided with operating handle 82 to indicate the position of the cable grounding switch.

The actuating member 50 is pinned to the shaft member 80 by means of pin 84 as indicated in FIG. 2 while the actuating handle 82 is connected to the other end of the shaft 80 by means of pin 86. The shaft 80 extends through the tank wall by means of a sealed bearing 88, in a manner which is well understood by those skilled in this art.

Handle 82 is provided with a stop means in the form of a pin member 90 which extends through a bushing 92 and is held in the position shown by means of a spring, indicated by the dotted member 94. As will be understood, the spring 94 holds pin 90 in its extended position as shown in FIG. 2. In this position, the extended pin 90 contacts the stop 96, which is mounted on tank wall 52, as shown. In order to move the handle beyond stop 96 it is necessary to grasp the knurled knob 98 connected to pin 90 and compress spring 94 to move the extended portion of pin 90 out of engagement with stop member 96. The handle 82 may then be moved in a position beyond stop 96. As will be understood, it is desirable to provide this type of stop means such that in moving the switch from one position where one of its contacts is closed to the opposite position where another of ts contacts is closed, that the handle positively stop in the open position demonstrated in FIG. 1 of the drawing. This is to prevent the accidental movement of the cable grounding switch from the energized cable position to the cable grounding position.

The movable contacts 54 and 56 are shown in the form of a pair of blade members which are pivotally mounted to the insulating member 58 by bearing means 100 and 102, respectively (best shown in FIGS. 2 and 3). As above mentioned, the insulating member 58 may be mounted to the tank wall 52 by means of bushings 60, 62. The insulating member 58 is secured to the bushing by screw means 104, 106 which only extend partially into the bushing, as indicated by the dotted line in FIG. 2. Of course, the opposite end of the bushing may be similarly secured to the tank wall 52, such as for example, by screws indicated at 108 in FIG. 2. A plurality of terminals indicated at 110, 112 and 114 are provided on the insulated member 58 in the manner shown. As will be understood, especially as indicated in FIG. 4 of the drawing, the central contact 110 of the cable grounding switch is adapted to be connected to a cable member such as cable 26 or 28 shown in FIG. 4. The terminal 112 is adapted for connection to the high voltage lead of a distribution transformer, while the contact 114 is adapted to be connected to a grounded portion of the transformer such as is indicated by switch 38 in FIG. 4.

As is apparent from FIGS. 1 and 2 of the drawing, the movable contacts 54 and 56 are electrically connected to terminal 110 through the strap 116 and the bearings 100, 102. The cable connected to terminal 110 may be connected to terminal 112 by means of movable contact 54 when the movable contact 54 engages the fixed contact 64. In a similar manner, the cable connected to terminal 110 may be also connected to terminal 114 when movable contact 56 engages fixed contact 66. Thus, in this manner, the terminal 110 and any cable connected thereto may be connected to either of the two terminals 112, 114, alternately, by means of the movable contacts 54 and 56.

As can be seen particularly from FIG. 2 of the drawing, the movable contacts 54 and 56 are in the form of a pair of blade members provided with biasing spring means, as indicated at 118, 120, which serve to tighten the electrical connection between the switch blades and the stationary contacts. Spring members 118 and 120 are in the form of compression springs which surround the pin or bolt 122 which extends through the switch blades in the manner particularly shown in FIG. 2. As can also be seen the bolt 122 also connects the switch blade to the connecting means 76. As will be understood as the switch blades close on the fixed contact the blades are forced against the contact to provide a good electrical connection. Further, the biasing springs 118, 120 force the switch blades into firm friction contact with the fixed contacts thereby requiring a certain force to overcome the friction and opening the movable contacts. As can be seen the spring means 68 and 70 for movable contact 54 are connected to the pin or bolt 122 at one end, while the opposite end is connected to a fixed member 124 which is bolted to the strap 116 and the insulating member 58. As will be apparent, especially from FIG. 1 of the drawing, the tension springs 68 and 70 connected to fixed contact 54 and tension springs 72, 74 connected to movable contact 56, are over or above the pivotal contact point 100 and 102, respectively, thereby providing an over-center means to aid in holding the movable contacts in their open position, shown in FIGS. 1 and 2. Of course, it will be evident that in closing either of the contacts the over-center action of these springs 68, 70 or 72, 74 must be overcome in the contact closing operation.

The connecting means 76, 78 which connect the actuating member 50 to movable contacts 54 and 56, respectively, will now be described. As can be seen from FIGS. 1 and 2, the connecting means are in the form of a pair of rods, such as rods 126 and 128 of the connecting means 76. The rod 126 is connected between movable contact 54 and rod 128 and is in the form of an insulating rod, while the other member 128 may be either an insulating or a metallic channel member. As shown, the insulating rod 126 is connected to the movable contact 54 by means of the pin or bolt 122 and is connected to channel member 128 by means of bolts 130. The member 128 is in the form of a channel in which is mounted a spring member 132. The spring member 132 is connected between the bolt 130 and a bearing member 134. The bearing member 134 connects the connecting means 76 to one portion of hte actuating member 50 as shown. The channel 128 is provided with a slotted opening 136 through which the bearing 134 extends and in which it is movable during operation of the actuating means 50. In the open position shown in FIG. 1, both of the springs, such as 132 in channel 128, are in their relaxed position with the movable contacts in the upward and open position, as shown.

Referring now to FIG. 3 of the drawing, when the actuating member 50 is rotated in a clockwise direction, to connect movable contact 54 with fixed contact 64, it will be apparent that the spring member 132 in channel 128 of connecting means 76 is placed in compression, pushing against the pin 130 connecting 128 and 126. As will be apparent the spring 132 will store energy in compression until such time as the force applied to contact 54 is sufficient to overcome the tension or force of the springs 68 and 70. At this point, the contact 54 will begin to close on contact 64 with the snap action of the stored energy in the spring 132. At the same time, as springs 68 and 70 begin to move downwardly with the movable contact 54 they will reach the over-center position with reference to the bearing 100 and will then add their energy to that of the compression spring 132, firmly closing contact 54 on contact 64 with a snap action.

Referring to both FIGS. 1 and 3, it will be apparent that when the actuating member 50 is rotated in a counter-clockwise direction to open contacts 54 and 64 that the spring member 132 will be placed in tension, being stretched within channel 128 between the pin 130 and the bearing 134. The stretching of the spring 132 will store energy which is suddenly released when the stored energy of the spring 132 overcomes the friction between movable contact 54 and fixed contact 64 and the over-center force of the springs 68 and 70. At this point, the movable contact 54 will open from the fixed contact 64 with a snap action. Of course, it will be understood that as the movable contact 54 begins to move upwardly, the tension springs 68 and 70 will move past the over-center position with reference to the bearing 100 and will then aid in moving the movable contact 54 to the open position shown in FIG. 1. From the above it will be apparent that by means of the spring 132 and the tension springs 68 and 70 that the movable contact 54 is moved with a snap action in both opening and closing of the contact without regard for the speed of movement of the actuating handle 50. Of course, it will be apparent that the same action is obtained in the opening and closing of the movable contacts 56 with the fixed contact 66.

As shown, particularly in FIG. 2, pin members 140 and 142 are provided on the insulating rod 126 and the insulating rod in the connecting means 78 to prevent movable contacts 54 and 56 from being opened too far during the opening sequence. This will prevent the springs 68 and 70 or springs 72 and 74 from pulling the movable contacts 54 and 56 too far in the open position, which might prevent their being properly closed on actuation of the handle 82. In a similar manner, stop means may be provided in the closing position of contacts 54 and 56 by means of washers 144, 146 which are mounted on the bolts 148, 150 which are used to attach the fixed contact 64 and terminal 112 and fixed contact 66 and terminal 114, respectively, to the insulated member 58. These washers 144, 146 will contact the sides of the blades in contacts 54, 56, in the manner especially shown in FIG. 3, to prevent the springs 68, 70, and 72, 74 from moving contacts 54 and 56, respectively, too far in the closed position.

From the above detailed description of a preferred embodiment of this invention it will be apparent to those skilled in the art that there has been shown and described a novel, three position, snap acting, cable grounding switch which may be particularly useful in open loop feed distribution systems. It will also be apparent that this three position, snap acting, cable grounding switch may also be used in other types of systems where it is desired to provide a switching means where contacts may be provided which are opened or where one contact is closed either on an energized member or a grounded contact. While the preferred embodiment of the invention has been described in accordance with the patent statutes, it will be understood that many modifications may be made in the construction and materials of this described switch without departing from the spirit and scope of the invention set forth. Such modifications are considered included, insofar as they fall within the scope of the invention defined in the claims appended hereto.

What is claimed as new and which it is desired to secure by Letters Patent of the United States is:

1. A three position, snap acting, cable grounding switch comprising: an actuating member, means for pivotally securing said actuating member to a mounting means, an insulating member, means for fixedly positioning said insulating member to the mounting means, a pair of fixed contacts mounted on said insulating member, a pair of movable contacts pivotally secured to said insulating member, a first terminal means electrically connected to one of said fixed contacts for electrical connection to an electrical apparatus, a second terminal means electrically connected to the other of said fixed contacts for electrical connection to a ground, a third terminal means electrically connected to said movable contacts for electrical connection to an electrical cable, connecting means connecting said movable contacts to said actuating member for movement of said movable contacts into and out of engagement with said fixed contacts, in one position of said actuating member one of said movable contacts engaging one of said fixed contacts to electrically connect said third terminal to said first terminal, in a second position of said actuating member said movable contacts being disengaged from said fixed contacts, in a third position of said actuating member the other of said movable contacts engaging the other of said fixed contacts to electrically connect said third terminal to said second terminal, and a plurality of separate spring means individually connected between each of said movable contacts and said insulating member in over-center relation to aid in opening and closing each of said contacts with a snap action.

2. A three position snap acting cable grounding switch as claimed in claim 1 in which an operating handle is provided connected to said pivotally securing means for actuating said actuating member, stop means on said handle to positively stop said actuating member in said second position when moving between said first and said third position, said stop means being releasable after stopping of said handle to allow further movement of said actuating member.

3. A cable grounding switch for use in a distribution open loop feed system in which each distribution transformer of the system is provided with a pair of cable grounding switches, said cable grounding switch comprising an actuating member adapted to be secured to a transformer, an insulating member forming part of said switch and adapted to be secured to a transformer, a pair of fixed contacts secured to said insulating member, one of said fixed contacts adapted for connection to the high voltage lead of a transformer, the other of such fixed contacts adapted for connection to a ground in a transformer, a pair of movable contacts pivotally mounted on said insulating member, a terminal means electrically connected to said movable contacts and adapted for connection to a cable for energizing a transformer, connecting means connecting said movable contacts to said actuating member for movement of said movable contacts into and out of engagement with said fixed contact, said actuating member being operable to place either of said movable contacts in engagement with one of said fixed contacts and being movable to a third position where both movable contacts are disengaged from said fixed contacts, spring means in said connecting means, a plurality of separate spring means individually connected between each of said movable contacts and said insulating member in over-center relation, said spring means in said connecting means and said plurality of separate spring means cooperating to move said movable contacts into and out of engagement with said fixed contacts with a snap action.

References Cited by the Examiner

UNITED STATES PATENTS

| 1,482,051 | 1/1920 | Turner | 200—42 |
| 2,874,338 | 2/1959 | Pease | 200—68 X |
| 3,015,005 | 12/1961 | Albert | 200—67 |

ROBERT K. SCHAEFER, *Primary Examiner.*

ROBERT S. MACON, *Examiner.*

H. HOHAUSER, *Assistant Examiner.*